United States Patent [19]

Pharris

[11] 4,044,971
[45] Aug. 30, 1977

[54] HIGH SPEED, LONG RANGE TURBO-JET AIRCRAFT

[75] Inventor: Jack W. Pharris, Alamogordo, N. Mex.

[73] Assignee: Ruth Walcott, Alburquerque, N. Mex.; a part interest

[21] Appl. No.: 599,106

[22] Filed: July 25, 1975

Related U.S. Application Data

[63] Continuation-in-part of Ser. No. 409,887, Oct. 26, 1973, Pat. No. 3,907,219.

[51] Int. Cl.$^2$ ................ B64C 27/22; B64C 27/30
[52] U.S. Cl. ...................... 244/7 R; 60/261;
60/39.53; 416/61; 416/149; 244/90 R
[58] Field of Search .......................... 244/6–8,
244/17.11–17.27, 55, 45, 54, 52, 90 R; 60/39.53,
226 R, 261–263; 416/87–89, 161, 23, 149, 150,
61; 415/147

[56] References Cited

U.S. PATENT DOCUMENTS

| 1,693,450 | 11/1928 | McCauley | 416/89 |
|---|---|---|---|
| 2,749,059 | 6/1956 | Meyers et al. | 244/7 R |
| 2,929,203 | 3/1960 | Henning et al. | 60/263 |
| 2,974,482 | 3/1961 | Kelley | 60/39.53 |
| 3,019,600 | 2/1962 | Peek | 415/147 |
| 3,060,685 | 10/1962 | Tonnies et al. | 244/55 |
| 3,090,198 | 5/1963 | Zeisloft | 60/263 |
| 3,111,005 | 11/1963 | Howell et al. | 60/261 |
| 3,148,848 | 9/1964 | Price | 60/263 |
| 3,163,376 | 12/1964 | Davidson | 244/7 R |
| 3,249,160 | 5/1966 | Messerschmitt | 416/87 |
| 3,280,555 | 10/1966 | Charpentier et al. | 60/39.53 |
| 3,374,631 | 3/1968 | Marks | 60/261 |
| 3,409,248 | 11/1968 | Bryan | 244/6 |
| 3,792,827 | 2/1974 | Girard | 244/7 A |

FOREIGN PATENT DOCUMENTS

| 739,314 | 10/1955 | United Kingdom | 60/226 R |

Primary Examiner—Trygve M. Blix
Assistant Examiner—Galen L. Barefoot
Attorney, Agent, or Firm—Clarence A. O'Brien; Harvey B. Jacobson

[57] ABSTRACT

An aircraft forwardly propelled by a power plant including a pair of jet engines, is operated in a VTOL mode by powered rotation of a rotary wing mechanically rotoring the engines. When unloaded during fixed wing flight, the power plant is operated in an accelerating rocket mode preceding high speed ram jet operation. Radially extensible blades of the rotary wing vary the mechanical loading on the engines while adjustable chokes at the intake of each engine and in the outlet of a common after-burner for the engines, condition the power plant for its different operational modes.

13 Claims, 19 Drawing Figures

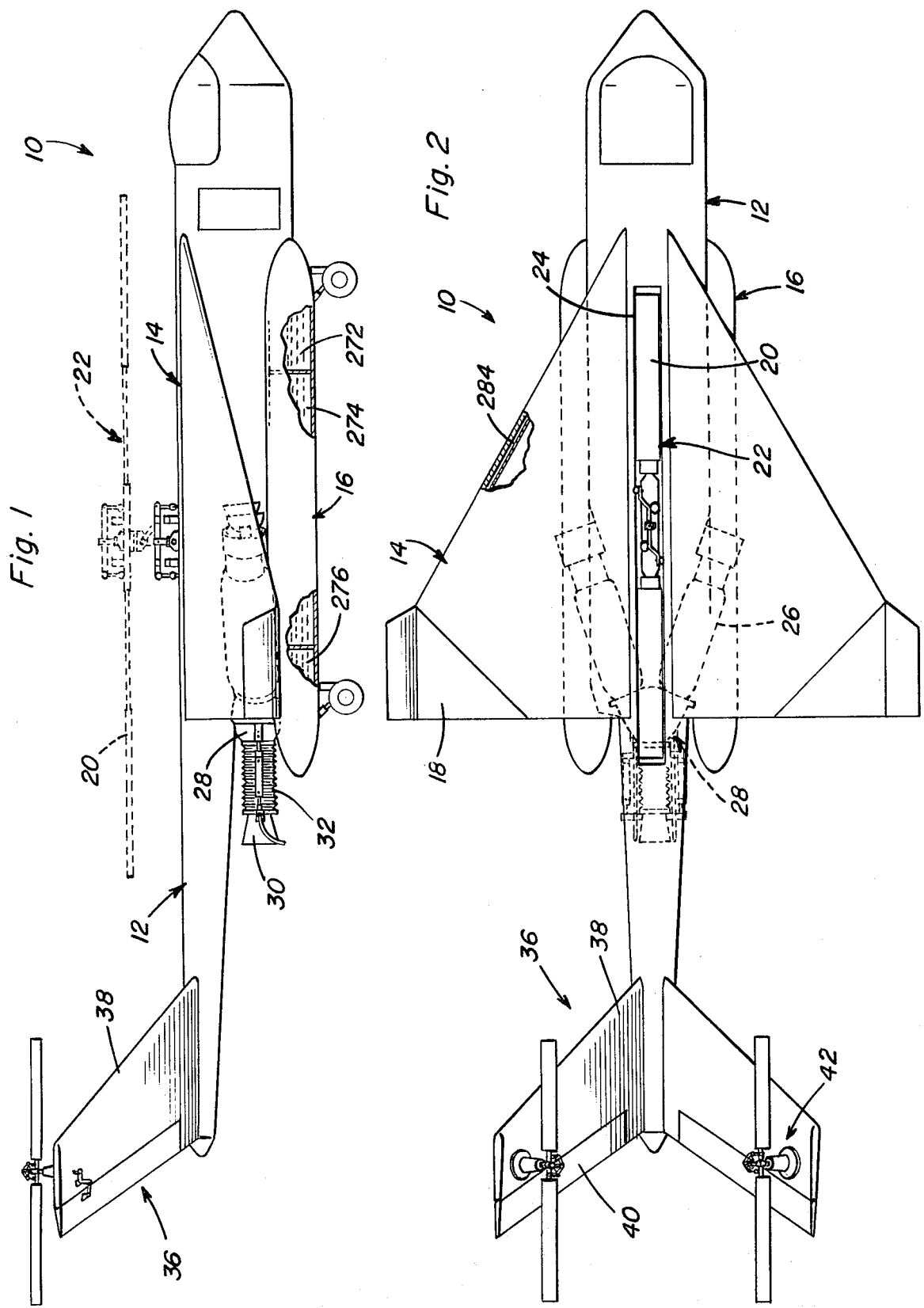

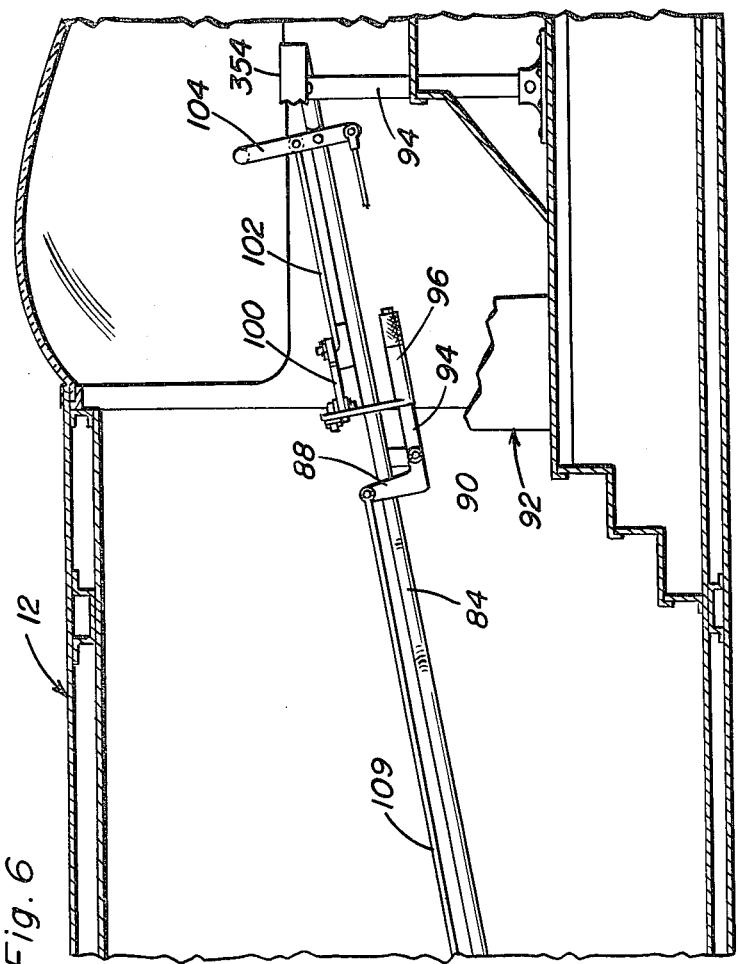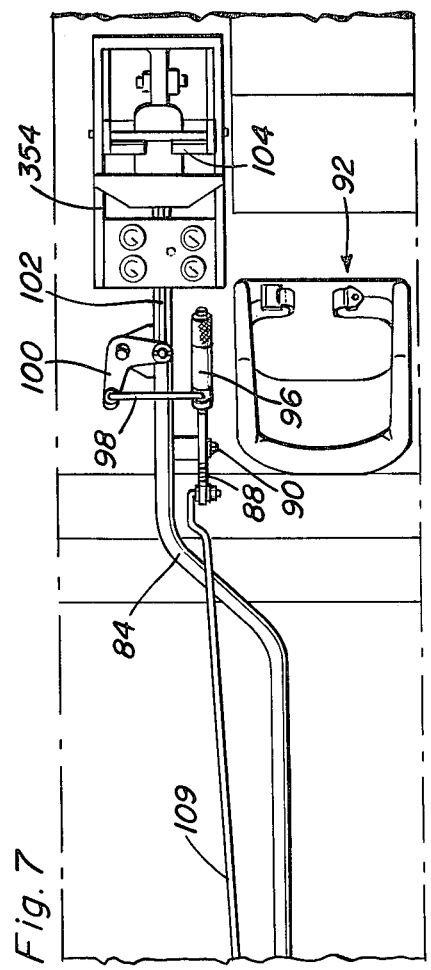
Fig. 6
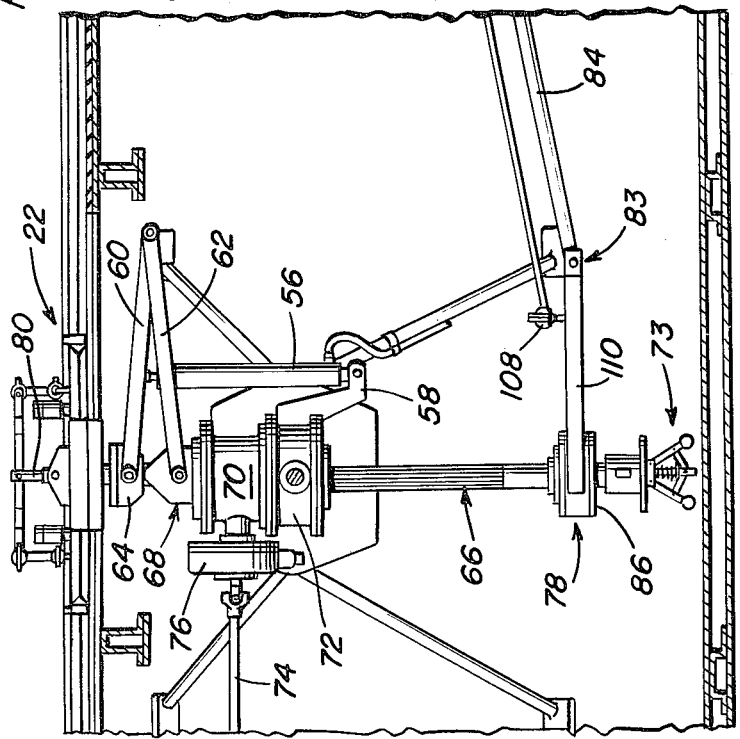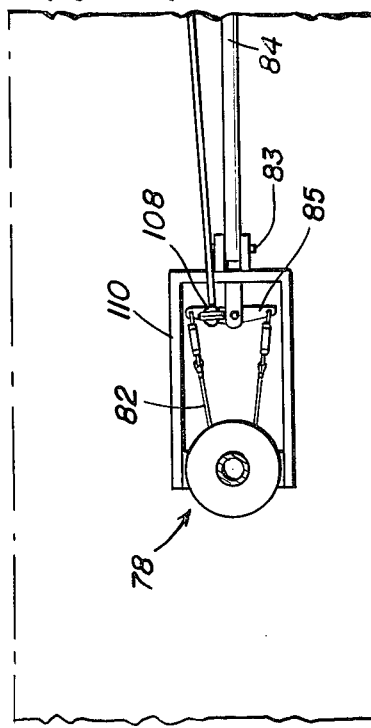
Fig. 7

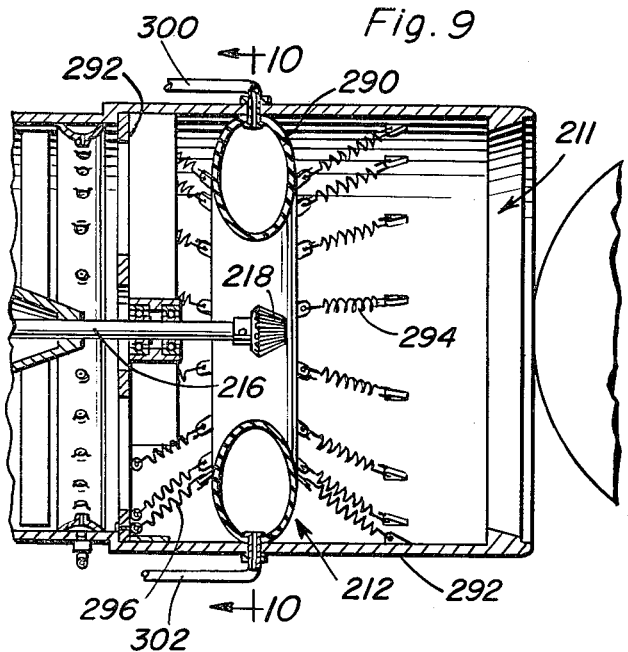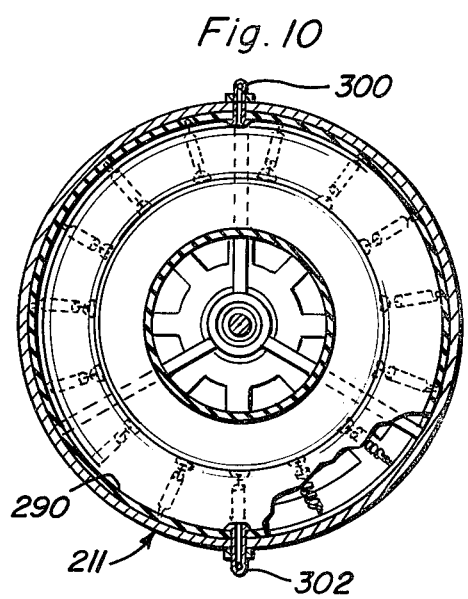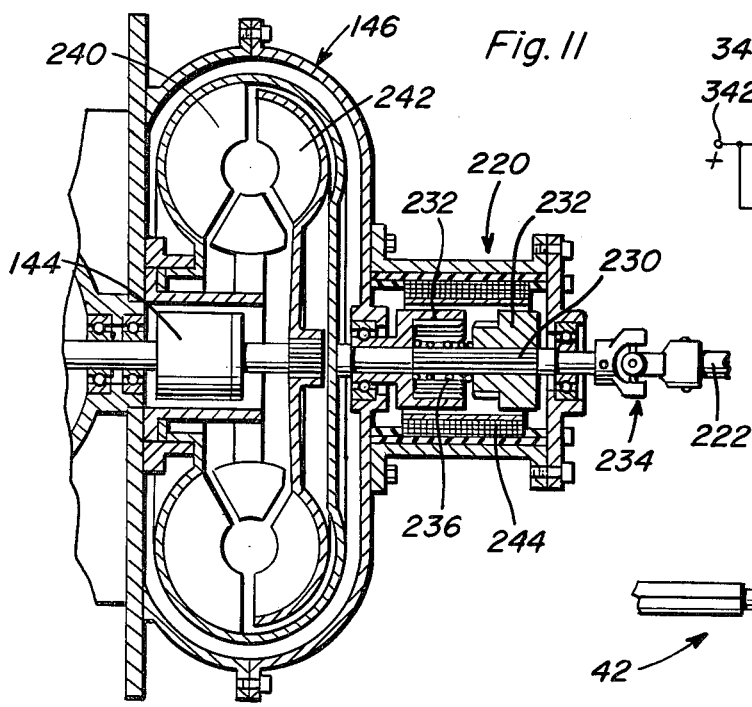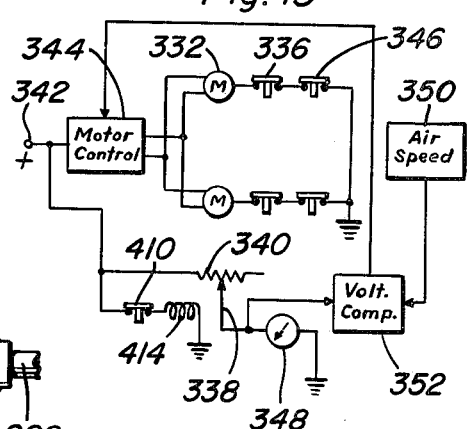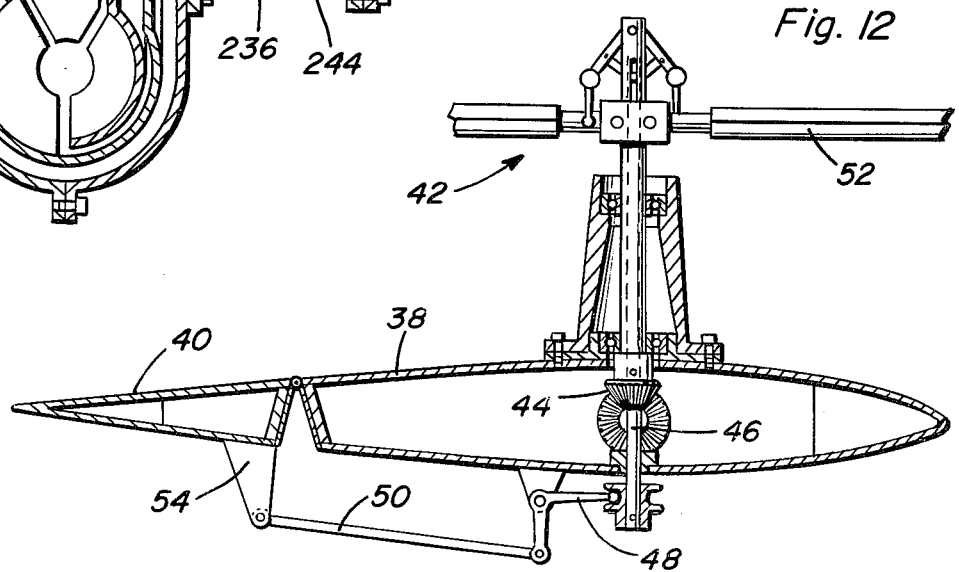

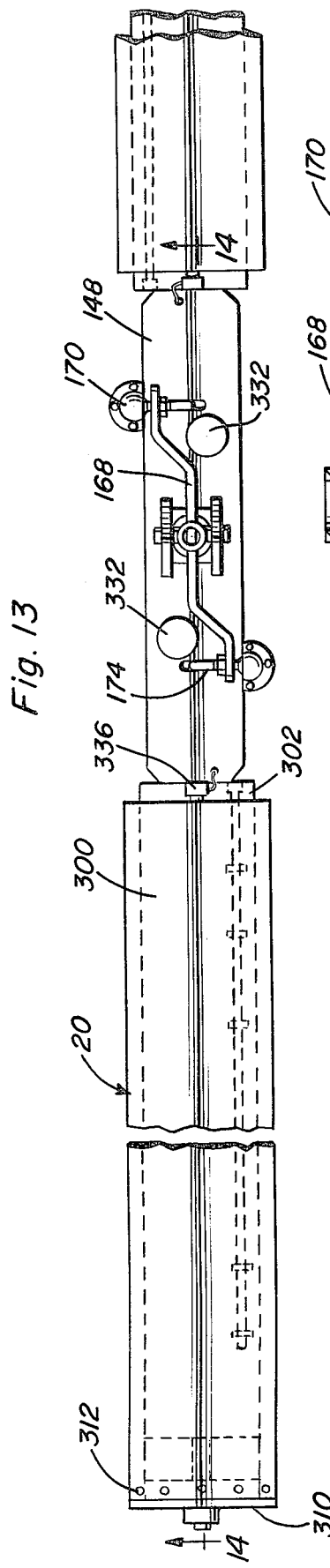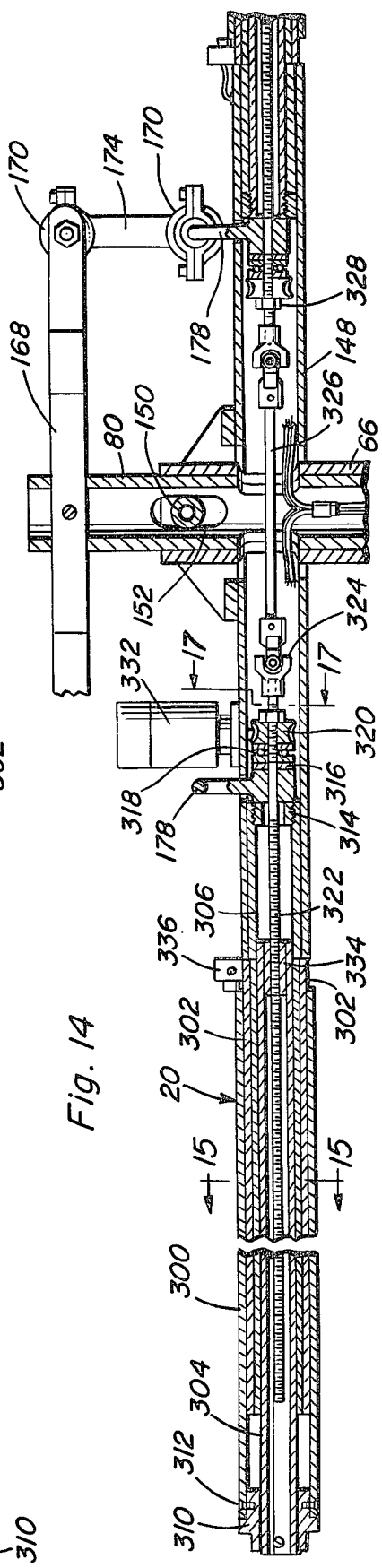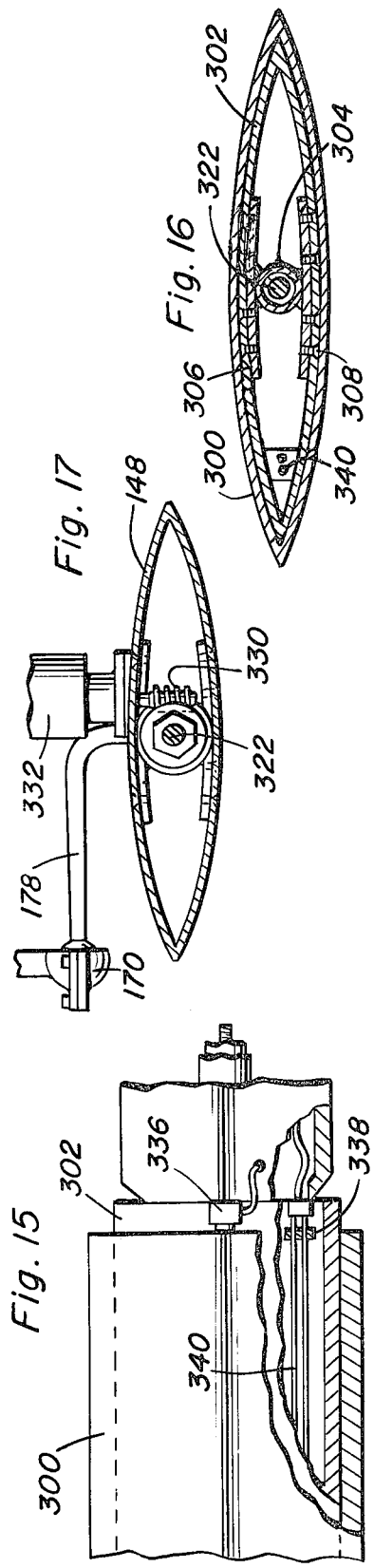

HIGH SPEED, LONG RANGE TURBO-JET AIRCRAFT

This invention relates to an improved type of aircraft propelled by reaction thrust engines which are conditioned for low speed operation to power a rotary wing assembly for vertical ascent or descent purposes, and is an improvement over the aircraft disclosed in my prior co-pending application U.S. Ser. No. 409,887, filed Oct. 26, 1973, now U.S. Pat. No. 3,907,219, with respect to which the present application is a continuation-in-part.

The aircraft disclosed in my prior co-pending application operated in both helicopter and fixed wing flight and included a retractable rotary wing assembly, as well as jet engines with power take-offs to the rotor assembly of the rotary wing. Such aircraft was designed to avoid the vibration and fatigue wear problems arising from the imcompatability between helicopter and fixed wing operations by appropriate conditioning of the engines from which power for producing thrust and vertical lift is obtained. The aircraft disclosed in the prior co-pending application thus embodied the desirable features of high speed, long range jet aircraft and a helicopter having a VTOL capability.

The composite type of aircraft of the present invention is not only endowed with the stability of high speed fixed wing aircraft, but is also endowed with VTOL hovering and slow flight and long range cruising capabilities of a rotary wing aircraft. The incompatability in attitude control and propulsion mode requirements between high speed, fixed wing and VTOL operations, is achieved by a rotor assembly which features a tubular rotor shaft that is axially displaceable, along a vertical axis affixed to the air frame between extended and retracted positions. The rotor shaft is externally splined intermediate its opposite ends for driving connection to the tail rotors associated with a tail assembly and a mechanical brake. The tail assembly includes elevator and rudder elements for pitch and yaw control of the airframe. The rotary wing assembly serves to produce vertical lift while the reaction thrust of the jet engines is arranged to enhance airframe stability and hovering capabilities during VTOL operations as well as to provide forward propulsion during autogyro and fixed wing operations. Torque is transmitted from the engines to the rotor shaft during powered rotation of the rotary wing assembly through a one-way, sprag-type clutch that is fixedly mounted in the airframe or fuselage of the aircraft, the rotor shaft being axially slidable relative to the clutch assembly by a powered retracting mechanism. In the extended position of the rotor shaft, the rotary wing assembly is supported by a bearing assembly secured to the upper end portion of the rotor shaft. This bearing assembly provides rigid support for the hub of the rotary wing assembly only in a direction parallel to the longitudinal axis of the airframe while accommodating flapping of the rotary wing assembly laterally of the fuselage. The flapping of the rotary wing assembly in the lateral direction cooperates with the tail rotors to provide airframe stability during VTOL operations. An adjustable thrust vectoring exhaust nozzle associated with the jet engines is designed to oppose attitude changing forces applied to the airframe during VTOL operations and to increase lift. During powered rotation of the rotary wing assembly, the jet engines are loaded through a transmission drivingly interconnecting the engines with the rotor shaft, the transmission including disengageable, positive-type clutches, fluid transmitters of the torque multiplying type and one-way clutch assemblies. During powered rotation of the rotary wing assembly, the jet engines are conditioned for low speed operation by restricting inflow and diverting flow in bypass relation to its high pressure compressor and turbine stages.

Pitch control for the rotary wing assembly is provided by means of an axially displaceable pitch control shaft that extends through and is rotatable with the rotor shaft. A non-rotatable casing operatively connected to the lower end of the rotor shaft slidably mounts a screw that is axially shifted by rotation of a nut in order to axially displace the pitch control shaft. The nut is actuated by a control cable supported on a tube assembly which is pivotally connected to the non-rotatable casing for displacement with the rotor shaft between the extended and retracted positions. Operating controls mounted on the tube assembly enables the aircraft pilot to achieve corrective pitch control, interrelated with engine throttle control, throttle control being exercised independently of any pitch control while the rotary wing assembly is retracted. Also, a centrifugal device driven by the rotor shaft, prevents retraction of the rotor assembly while it is undergoing powered rotation.

The spline portion of the rotor shaft is drivingly engaged with a tail rotor drive gear drivingly connected to a mechanical brake assembly for stopping rotation of the rotary wing assembly and the tail rotors prior to retraction of the rotary wing assembly when fixed wing flight conditions are achieved. A camming arrangement is provided to angularly orientate the rotary wing assembly to a proper position as it is fully retracted into a recess formed within the top of the aircraft fuselage for this purpose. A mechanical lock associated with the camming assembly holds the rotary wing assembly in this angular position.

The fan jet engines which form part of the power plant are arranged in converging relationship to each other for discharging combustion products into a common outlet casing enclosing an after-burner chamber to which the vectoring exhaust nozzle is connected. Propellant, rocket fuel and oxygen may be supplied under pilot control to the after-burner chamber to produce an accelerating rocket mode of operation for the power plant prior to operation of the power plant for high speed cruising in a ram jet mode. A refrigerant type of propellant fluid may be conducted through evaporator tubing prior to injection into the engines in order to cool surfaces of the aircraft subject to heating by skin friction at high cruising speeds.

These together with other objects and advantages which will become subsequently apparent reside in the details of construction and operation as more fully hereinafter described and claimed reference being had to the accompanying drawings forming a part hereof, wherein like numerals refer to like parts throughout.

FIG. 1 is a side elevational view with parts broken away and shown in section of an aircraft constructed in accordance with the present invention.

FIG. 2 is a top plan view of the aricraft shown in FIG. 1 with parts broken away and shown in section.

FIG. 6 is a longitudinal sectional view through a portion of the aircraft fuselage showing the rotor assembly and associated control mechanisms.

FIG. 7 is a top plan section view of the controls associated with the rotor assembly shown in FIG. 6.

FIG. 9 is an enlarged, partial side sectional view of the intake portion of one of the jet engines shown in FIG. 5.

FIG. 10 is a transverse sectional view taken substantially through a plane indicated by section line 10—10 in FIG. 9.

FIG. 11 is a side sectional view through one of the fluid transmitters and disengageable clutch assemblies associated with the power plant shown in FIG. 5.

FIG. 12 is an enlarged side sectional view through a portion of the tail assembly associated with the aircraft.

FIG. 13 is an enlarged, partial top plan view of the rotary wing assembly associated with the aircraft.

FIG. 14 is a sectional view taken substantially through a plane indicated by section line 14—14 in FIG. 13.

FIG. 15 is a partial plan view of a portion of the rotary wing assembly shown in FIG. 13, with parts broken away and shown in section.

FIG. 16 is a transverse sectional view taken substantially through a plane indicated by section line 16—16 in FIG. 14.

FIG. 17 is a transverse sectional view taken substantially through a plane indicated by section line 17—17 in FIG. 14.

FIG. 19 is a simplified electrical circuit diagram showing certain controls associated with the aircraft.

Figure 3:
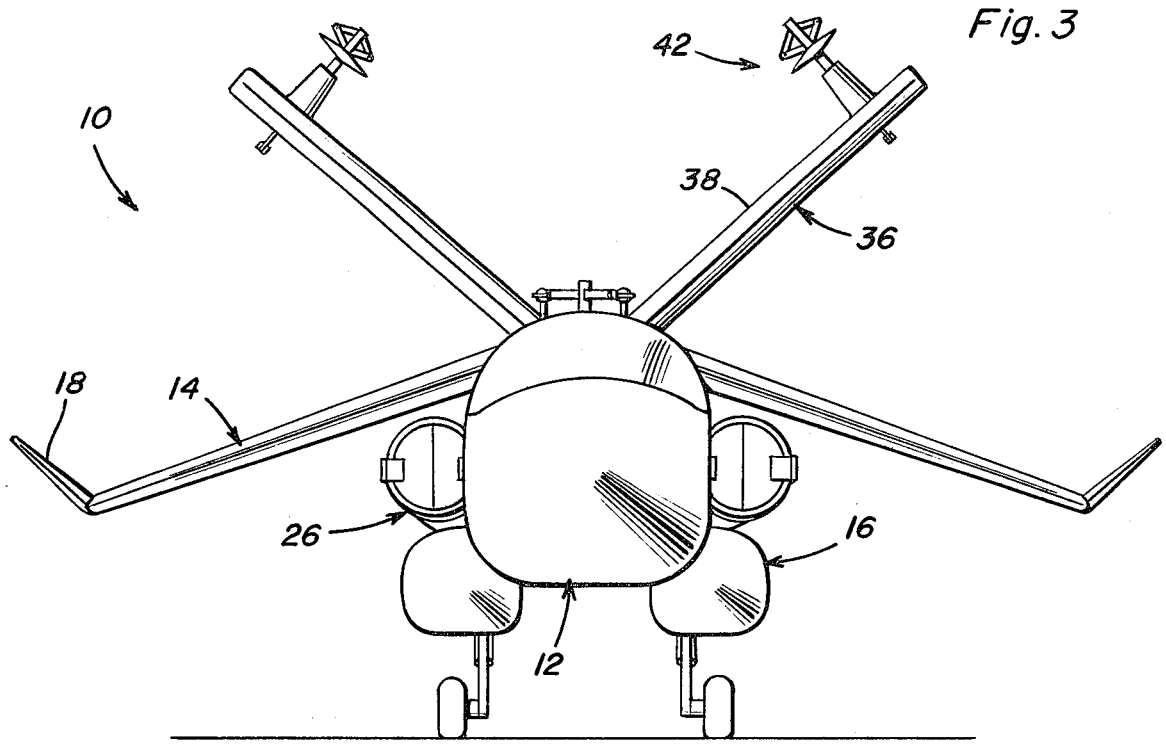
FIG. 3 is a front elevational view of the aircraft shown in FIGS. 1 and 2.

Referring now to the drawings in detail, FIGS. 1, 2 and 3 illustrate an aircraft constructed in accordance with the present invention and generally denoted by reference numeral 10. The airframe of the aircraft includes an elongated tubular fuselage generally referred to by reference numeral 12 from which a pair of fixed delta-shaped wings 14 extend. A pair of fuel tanks 16 are mounted on the sides of the fuselage below the wings 14 in parallel relationship to each other. The fixed wings 14 are provided with a negative dihedral and an extra large pair of ailerons 18 pivoted along hinge lines tilted forwardly at the outer tips of the wings between 45° and 60° to the lateral axis of the aircraft so as to encompass the entire wing tip. This arrangement not only provides the aircraft with normal aileron control during conventional fixed wing flight, but also provides roll control during VTOL operations by reason of its vectoring ability with respect to the slipstream downwash from rotor blades 20 associated with a rotary wing assembly 22 shown in an extended position by dotted line in FIG. 1. The top of the fuselage 12 is provided with an elongated recess 24, as more clearly seen in FIG. 2, within which the rotary wing assembly is received in a retracted position, as shown by solid line.

Figure 4:
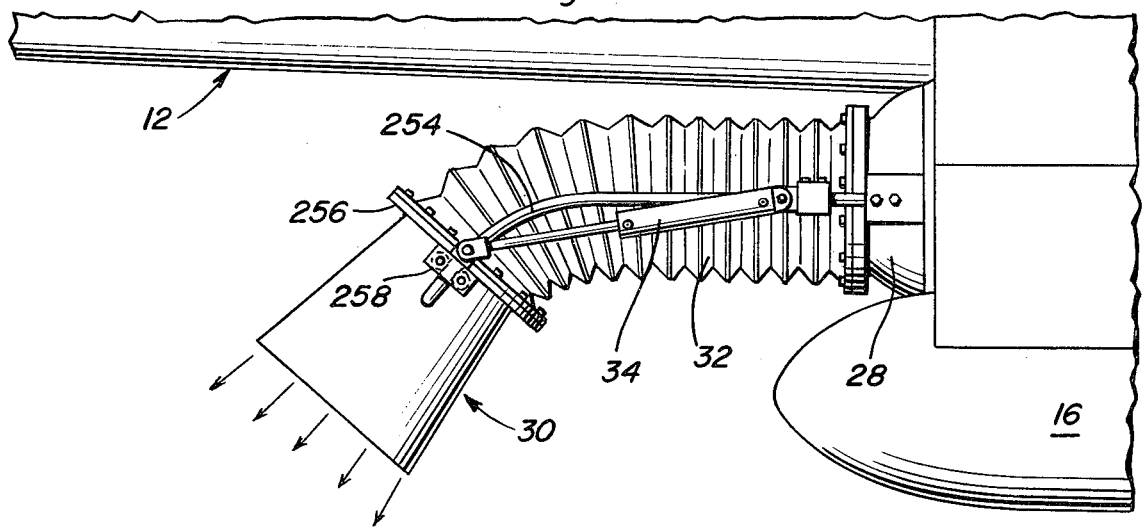
FIG. 4 is an enlarged partial side elevational view of a portion of the aircraft with the exhaust nozzle of the power plant shown in a downwardly directed position.

Secured to the underside of the fixed wings 14 in rearwardly converging relationship to each other, are a pair of engines 26 hving a common outlet casing 28 and a common exhaust nozzle 30 connected to the casing 28 by means of adjustable bellows 32. The exhaust nozzle 30 is selectively adjusted, for directing reaction thrust, by a pair of hydraulic control devices 34, as more clearly seen in FIGS. 4 and 5.

With continued reference to FIGS. 1, 2, and 3, a V-shaped tail assembly generally denoted by reference numeral 36 is connected to the rear end of the fuselage and includes upwardly diverging stabilizer panels 38 fixed to the fuselage and pivotally mounting rearwardly extending rudder-elevator elements 40. Tail rotor assemblies 42 are mounted on each panel 38 adjacent the outer tips thereof and just forwardly of the rudder-elevator elements 40. The tail rotor assemblies 42 control pitch and yaw movement of the tail portion of the aircraft during powered rotation of the rotary wing assembly 22. Conventional control of the aircraft during fixed wing operation is also provided for through the control elements 40 on the tail assembly.

As more clearly seen in FIG. 12, each of the tail rotor assemblies 42 is driven by a gear 44. A pitch control rod 46 is axially displaced through bell crank 48, push rod 50 and control arm 54 by the rudder-elevator 40 when adjusted under pilot control in a conventional manner to change the pitch of the rotor blades 52. Accordingly, pitch control of the tail rotor assemblies 42 are coordinated with control of the rudder-elevators 40 during powered rotation of the rotary wing assembly 22, while conventional control of the aircraft during fixed wing operation is provided for through the rudder-elevators 40 alone.

Referring now to FIG. 6 in particular, the rotary wing assembly 22 is vertically displaced relative to the fuselage 12 by means of a power operated retracting mechanism which includes a hydraulic piston device 56 pivotally anchored to the fuselage through an anchoring bracket 58. The piston rod associated with the hydraulic device 56 is pivotally connected to an actuating lever 60 pivotally connected at one end to lever 62 and at the other end to an axially shiftable bearing support assembly 64 that is operatively connected to a rotor shaft assembly 66 rotatable about a fixed axis intersecting the longitudinal axis of the fuselage and perpendicular thereto. The lever 62 is pivotally anchored to the fuselage through a cam and locking assembly 68. The cam and locking assembly 68 is fixed to the upper end of a gear casing 70 which in turn is positioned above a one-way clutch assembly 72. The rotor shaft assembly 66 is axially slidable through the gear casing 70 and the assemblies 68 and 72 from the retracted position shown in FIG. 6 in order to elevate the rotary wing assembly 22 from the recess 24 in the top of the fuselage by means of the bearing assembly 64 in response to extension of the hydraulic piston device 56. Suitable fluid connections to pilot operated valve controls, well known to those skilled in the art, are provided for this purpose.

Torque is transmitted to the rotary wing assembly 22 through the clutch assembly 72 and the rotor shaft assembly 66 when displaced to it extended position. During rotation, retraction of the rotor shaft and rotary wing assembly is prevented by means of a ball governor-type of centrifugal device 73 connected to the lower end of the rotor shaft assembly, as shown in FIG. 6. Rotation of the rotor shaft assembly is also transmitted to the tail rotor assemblies 42 through a suitable drive connection including a drive shaft 74. A mechanical brake assembly 76 is provided in order to stop rotation of the rotary wing assembly 22 and the tail rotor assemblies 42 in preparation for conventional, fixed wing flight.

Figure 8:
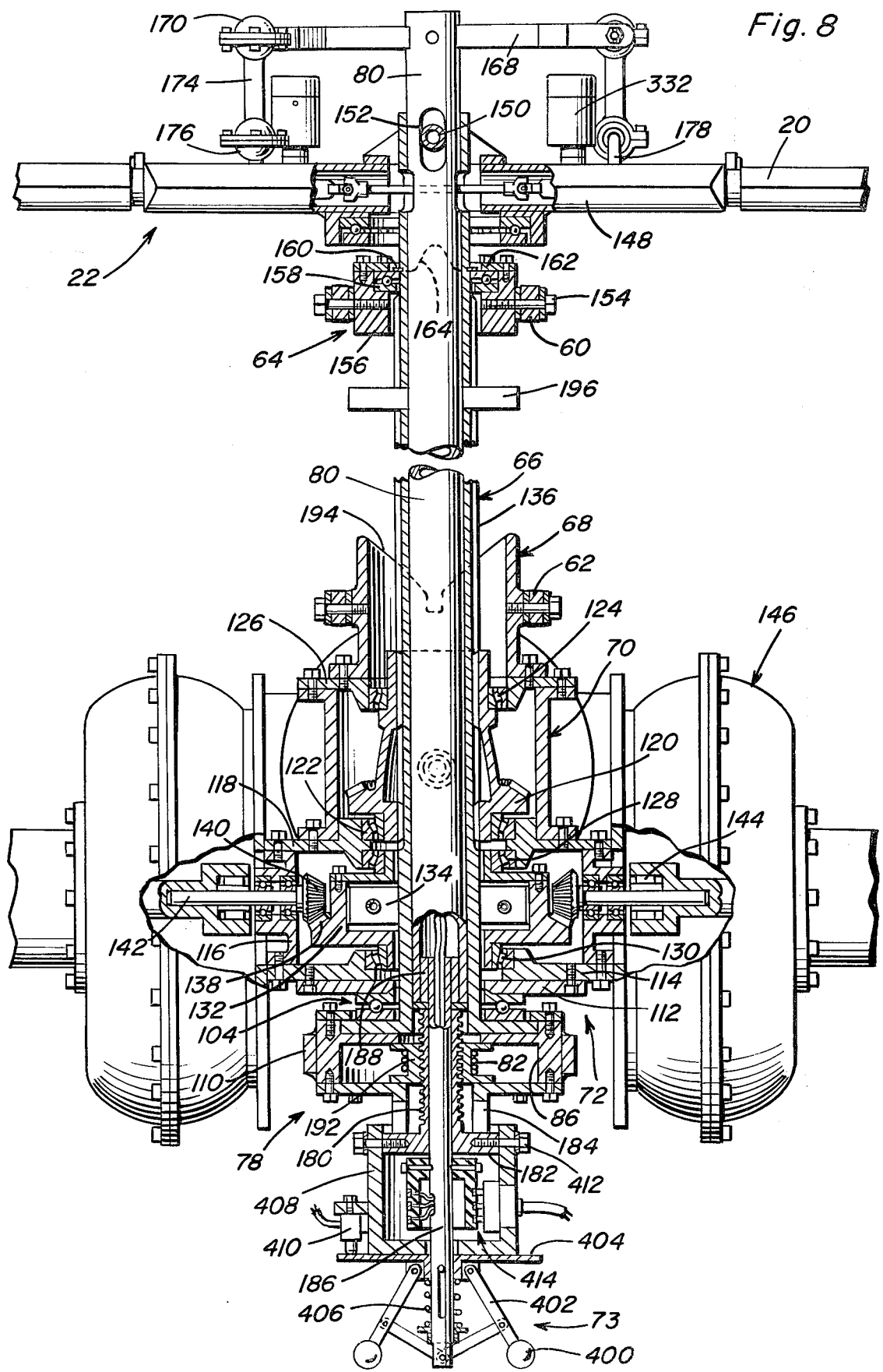
FIG. 8 is an enlarged partial section and side elevational view of the rotor assembly.

Referring now to FIG. 8, the rotor shaft assemby 66 is connected at its lower end to the housing 86 of a pitch control mechanism generally referred to by reference numeral 78 by means of a flange 102. An axial thrust bearing assembly 104 is secured to the flange 102 in order to accommodate rotation of the rotor shaft relative to the axially fixed clutch assembly 72 when in abutment therewith as shown. The weight of the aircraft axially loads the thrust bearing assembly 104 when the aircraft is suspended from the rotor blade assembly 22 during helicopter operation of the aircraft. The casing 86 will be axially displaceable with the rotor shaft assembly 66 and is held against rotation by the arms of the yoke 110. The yoke is pivotally connected in spaced relationship to the rotor assembly by pivot assembly 83 to an elongated support tube 84, as shown in FIG. 6.

In the upper extended position of the rotor shaft assembly 66, as shown in FIG. 8, the bearing assembly 104 abuts the bearing plate 112 secured to the underside of the end wall 114 which is connected to the annular housing 116 of the one-way clutch assembly 72. The opposite end wall 118 of the clutch housing is in turn secured to the gear housing 70 enclosing the tail rotor drive gear 120. The tail rotor drive gear 120 is rotatably mounted by spaced bearing assemblies 122 and 124 assembled within the end wall 118 of the clutch housing and an end wall 126 interconnected with the gear casing 70 and the cam and lock assembly 68. The end walls 118 and 114 also mount bearing assemblies 128 and 130 which rotatably mount the outer race member 132 of the one-way clutch assembly 72, internally engaged by the sprag elements 134 of a conventional type one-way clutch device. These sprag elements 134 also engage the external surface of the rotor shaft assembly 66 between the end flange 102 and an intermediate spline portion 136 with which the tail rotor drive gear 120 is engaged within the gear casing 70. The outer race member 132 of the one-way clutch assembly is provided with a bevel gear formation 138 in meshing engagement with a pair of bevel gears 140 supported by bearings in the annular housing 116 of the one-way clutch assembly. The bevel gears are connected to shafts 142 that extend 180° relative to each other from the one-way clutch assembly and are coupled by means of one-way clutches 144 to the driven members of a pair of fluid transmitters 146 of the torque multiplying type through which torque is transmitted from the engines 26 to the rotor shaft assembly via the one-way clutch assembly 72. In this fashion, the rotor shaft assembly may overrun the low speed drive supplied thereto from the engines as the aircraft speed increases and autogyro operation begins during the transition to conventional, fixed wing flight.

With continued reference to FIG. 8, the cam and locking assembly 68 is fixed to the fuselage and is provided with an upper cam surface 194 arranged to be engaged by the pin 196 extending radially from the rotor shaft 66. Accordingly, as the rotor assembly is retracted downwardly, the pin 196 upon engagement with the cam surface 194 will angularly rotate the rotary wing assembly 22 toward a position parallel to the longitudinal axis of the fuselage. When the rotary wing assembly is fully retracted into the recess 24 formed in top of the fuselage, the pin 196 will enter the notch 198 and thereby positively lock the rotary wing assembly against rotation.

Figure 5:
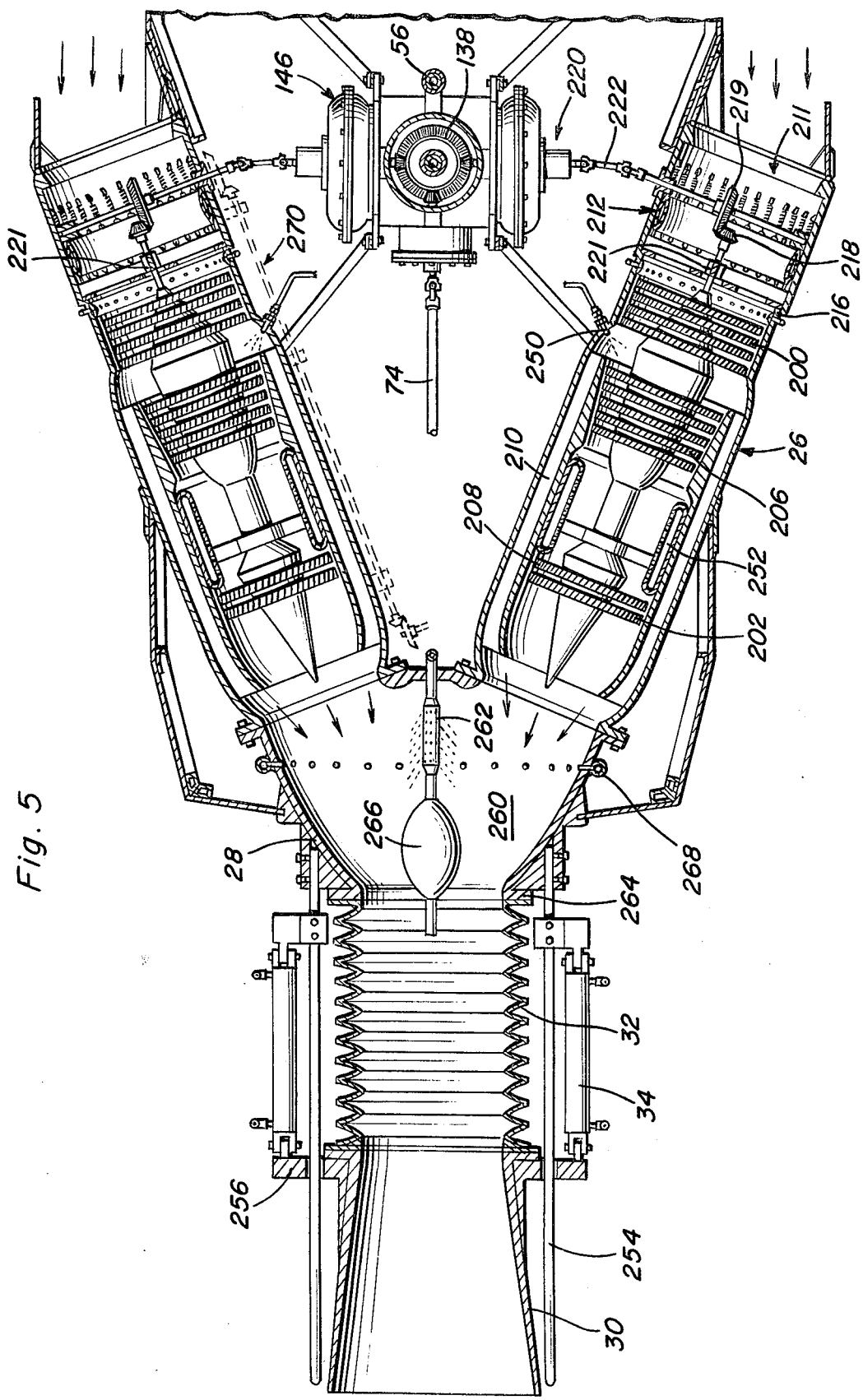
FIG. 5 is a top sectional view through the power plant assembly associated with the aircraft.

Referring now to FIG. 5, each of the engines 26 is of a modified fan-jet type having a low pressure compressor stage 200 rotated by a low pressure turbine 202 in response to the flow of combustion products. A high pressure compressor stage 206 rearwardly spaced from the low pressure compressor stage is in turn driven by a high pressure turbine 208. During operation of the engine 26, at a relatively high speed, flow of air induced by the low pressure compressor stage 200 will by-pass the high pressure compressor and turbine stages through the annular by-pass passage 210 to produce an exhaust jet for reaction thrust propulsion of the aircraft. Such operation will, of course, require the unobstructed inflow of air through the intake 211 of the engine. The engine is mechanically loaded by a power take-off connected to the compressor shaft 216 of the low pressure compressor stage 200. Power take-off is provided by reduction bevel gears 218 and 219 which drivingly interconnect each engine 26 to an associated one of the torque multiplying, fluid transmitters 146 through disengageable clutch assemblies 220 and 221 and a universal connecting shaft 222. When the clutch 220 is disengaged, the engine 26 will be mechanically unloaded from the rotor assembly so that it may then be conditioned for normal operation at high speed.

Referring now to FIG. 11, the disengageable clutch assembly 220 includes an axially shiftable, positive coupling element 232 slidably mounted on a splined shaft 230 coupled to the universal shaft 222 by a universal joint 234. The coupling element 232 is biased to a disengaged position by a spring 236 seated within an internally splined, driven coupling element 238 connected to the impeller element 240 of the torque multiplying fluid transmitter 146. The driven turbine element 242 of the fluid transmitter is in turn connected through the one-way clutch 144 to the rotor drive shaft 66 through one-way clutch assembly 72. An electromagnetic coil assembly 244 within the disengageable clutch assembly 220 is mounted in coaxial relationship to the coupling elements 232 and 238. Thus, upon energization of the electromagnetic coil assembly 244, the coupling element 232 is axially displaced against the bias of spring 236 into engagement with the coupling element 238 in order to engage the clutch and thereby drivingly interconnect the engine 26 with the rotor drive shaft 66 through the fluid transmitters 146 and the one-way clutch assembly 72.

Referring once again to FIG. 5, the intake end portion 211 of each engine 26 includes an adjustable inflow choke device generally referred to by reference numeral 212. By means of this choke device, the engine may be conditioned for low speed operation by reducing the inflow rate and diverting the inflow of air through the by-pass passage 210. Thus, with the inflow of air appropriately reduced and diverted around the high pressure stages, low speed operation of the engine will be achieved while it is mechanically loaded, as aforementioned. Heated propellant fluid is introduced into the engine between the compressor stages 200 and 206 by a nozzle device 250 to mix with the inflowing air and form a fuel mixture that is ignited and burned by means of the fuel burners 252 located axially between the compressor stage 206 and the turbine stage 208. The exhausts from both engines 26 converge into the common outlet housing 28 which forms an after-burner within which additional combustion takes place before the combustion products are discharged through the bellows 32 and exhaust nozzle 30 to atmosphere producing a reaction thrust. The direction of the reaction thrust is controlled by means of the fluid piston devices 34. Toward that end, a pair of curved guide rods 254 are anchored to the common outlet casing 28 and extend rearwardly and downwardly therefrom, as more clearly seen in FIG. 4. One end of each piston device is pivotally anchored to a guide rod with its piston rod pivotally connected to the flange 256 of the exhaust nozzle 30. The exhaust nozzle flange 256 is provided with openings through which the guide rods 254 extend. Also, the guide rods are engaged by roller bearing assemblies 258 mounted rearwardly on the exhaust nozzle flange in order to firmly hold the exhaust nozzle in its angularly adjusted position on the guide rods 254. The exhaust flow stream is conducted to the exhaust nozzle from the common outlet casing 28 through the bellows 32 which is interconnected at opposite ends to the flange 256 and the outlet casing 28.

The after-burner chamber 260 formed within the outlet casing 28, as shown in FIG. 5, is supplied with liquid oxygen for rocket accelerating operation through a perforated tube 262. Also, fixedly mounted within the common outlet casing 28 in concentric relationship to the outlet flange 264 to which the bellows 32 is connected is a variable volume center body 266, the volume of which varies in accordance with temperature in order to control the outflow area for the exhaust gases from the engines. Rocket fuel is supplied to the after-burner chamber 260 through an annular fuel manifold 268 having a plurality of outlet ports for directing a radial inflow of fuel into the after-burner chamber while engines are being operated for short accelerating periods in a rocket mode. Power for operating the pumps for supply of propellant fluid to the nozzle devices 250 is transmitted by a power take-off 270 from the power driven bevel gear 219 in the intake end portion 211 of one of the engines, upon engagement of clutch 221, as shown in FIG. 5.

Figure 18:
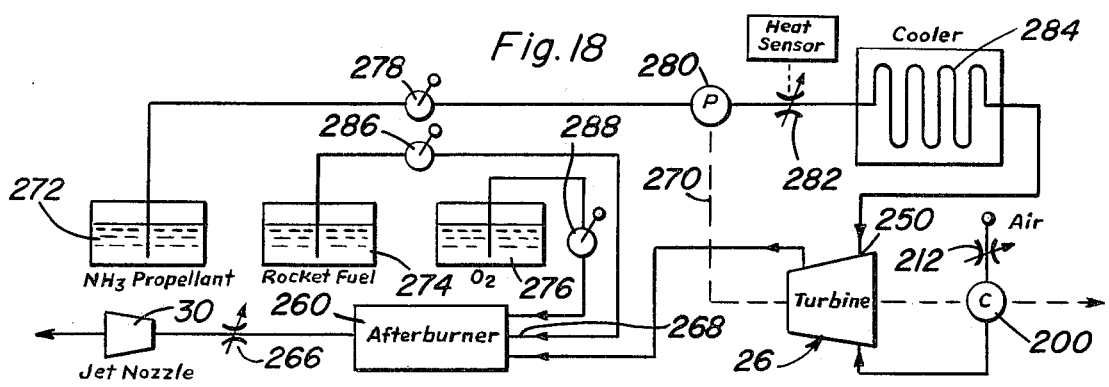
FIG. 18 is a fluid circuit diagram showing certain controls associated with the power plant.

Each of the fuel tanks 16 may be partitioned into three separate compartments as shown in FIG. 1 within which the propellant refrigerant fluid, such as ammonia 272, the rocket fuel 274 and the liquid oxygen 276 may be stored for supply to the engines 26 as aforementioned. As diagramatically shown in FIG. 18, the propellant fluid 272 is supplied through a control valve 278 to the engine inlet nozzles 250. A circulating pump 280 induces flow of the propellant 272 through a heat responsive expansion valve 282 and evaporator tubing 284 within which it is heated before being supplied to the inlet nozzles 250. The evaporator tubing 284 may be in the form of a conduit placed, for example adjacent the leading edge of the fixed wings 14 as shown in FIGS. 2 and 18. In this fashion, aircraft surfaces heated to high temperatures by skin friction, may be cooled during high speed flight conditions. The rocket fuel 274 is conducted through a control valve 286 to the fuel manifold 268 aforementioned. Finally, the liquid oxygen is admitted through valve 288 to the after-burner chamber 260 to which the exhaust gas from the engine 26 is conducted. Control over the inflow rate ofthe propellant 272 and rocket fuel 274 is effected by the aircraft pilot through the valves 278 and 286, while automatic control is exercised through the heat responsive expansion valve 282 and the evaporator tubing 284. Automatic control over the inflow of air to the engines is effected through the inflow choke device 212 and the outflow rate choke device 266 as diagrammed in FIG. 18.

As more clearly seen in FIGS. 9 and 10, the inflow choke control device 212 is mounted within the intake end portion 211 of each engine 26. The inflow control device 212 includes an annular tube 290 made of an elastically flexible material so as to expand volumetrically in response to the inflow of a pressurized gas. The annular tube 290 is yieldably positioned within the tubular housing 292 of the intake end portion 211 by means of a plurality of spring elements 294 connected to the annular tube 290 on one axial side with corresponding spring elements 296 being interconnected with the annular tube 290 on the other axial side and anchored to a fixed spider structure 298. An inlet tube 300 is connected at one location to the annular tube 290 while an outflow bleed tube 302 is connected at another location thereto. The expansible annular tube 290 will accordingly be inflated by gas supplied under pilot control or automatically regulated pressure obtained from the gas generator section of the engine 26. With the gas being bled continuously from the expansible annular tube 290 through the bleed outlet 302, the pressure regulated inflow rate to the annular tube 290 will determine its degree of inflation in order to correspondingly reduce the inflow area and inflow rate of air to the engine during low speed operation causing diversion of the inflow through the passages 210 by-passing the high pressure compressor and turbine stages.

Referring now to FIG. 8, the rotary blades 20 associated with the rotary wing assembly 22 are carried by a rotor hub 148 secured to the upper end portion of the rotor shaft assembly 66 by means of a pin 150 which extends through a slot 152 formed in the pitch control shaft 80. The rotor hub is supported by the bearing assembly 64 to which the actuating lever 60 is pivotally connected by means of the pivot connections 154. The bearing assembly 64 includes a non-rotatable annular member 156 within which the ball bearing assembly 158 is seated and from which the pivot connections 154 extend. A lock ring 160 axially fixes the bearing assembly to the rotor shaft 66 through the ball bearing assembly 158 which is held assembled within the annular member 156 by the retainer ring 162. While one race of the ball bearing assembly 158 is fixed by the ring 162 to the rotor shaft in order to prevent relative axial movement between the rotor shaft and the bearing assembly 64, the annular member 156 is non-rotatable by virtue of its pivotal connection to the actuating lever 60. The annular member 156 is also provided with a pair of engaging formations 164 spaced 180° from each other and aligned along the longitudinal axis of the fuselage in order to provide rigid support in the direction of the longitudinal axis for the rotor hub 148. It will be apparent, however, that such rigid support will not be available for the rotor hub 148 in lateral directions relative to the fuselage so as to permit flapping of the rotary wing assembly in such lateral directions. This lateral flapping freedom for the rotary wing assembly cooperates with the control exercised through the tail rotor assemblies 42 to provide stability for the aircraft and attitude control during powered rotation of the rotary wing assembly.

Pitch adjustment for the rotary blades 20 is effected through the pitch control shaft 80 by means of the pitch control bar 168 extending through the upper portion of the pitch control shaft generally parallel to the rotor blades 20. Opposite end portions of the bar 168 are connected by universal joints 172 to links 174 on opposite sides of the rotor hub. The lower ends of the links 174 are connected by universal joints 176 to pitch adjusting levers 178 connected to the rotor blades 20. Accordingly, the opposite rotor blades 20 will be angularly adjusted about their longitudinal axes in response to vertical displacement of the pitch control shaft 80.

The pitch control shaft 80 is axially shifted in order to effect a change in the pitch or angle of attack of the rotor blades 20 by means of the externally threaded screw element 180 extending downwardly from the lower end portion of the rotor shaft assembly 66. The lower end of the screw element is provided with a flange 182 slidably received in a slotted formation 184 projecting from the casing 86 of the pitch control mechanism 78. Thus, the screw element 180 is prevented from rotation. The screw element forms a sleeve bearing for tubular shaft 186 rotationally fixed by connector 188 to the lower end of the pitch control shaft 80 so as to accommodate its rotation with the tubular rotor shaft 66. The screw element 180 is threadedly engaged by a nut element 192 rotatably mounted within the casing 86 and peripherally engaged by several turns of the actuating cable 82. Accordingly, rotation of the nut element 192 in opposite directions will produce a corresponding axial displacement of the screw element 180 in order to axially shift the pitch control shaft 80 relative to the rotor shaft 66 witin the limits established by the slot 152 through which the coupling pin 150 extends to interconnect the rotor shaft with the rotor hub 148.

Referring now to FIGS. 13 and 14 in particular, it will be noted that each of the rotary blades 20 includes an outer air foil member 300 that is slidably mounted on an inner air foil member 302 extending from each radially outer end of the rotor hub 148. The inner air foil member 302 is connected to the rotor hub 148 by means of a pair of connector plates 306 secured to the inner air foil member 302 by a plurality of fasteners as more clearly seen in FIG. 16. A tubular member 304 is positioned centrally within outer air foil member 300. The radially outer ends of each of the tubular members 304 are pinned to collars 310 to which the radially outer ends of the outer air foil members 300 are secured by fasteners 312. Accordingly, the outer air foil members 300 together with the inner tubes 304 will be slidably displaceable relative to the inner air foil members 302 so as to slidably guide axial movement of the tube 304. An abutment ring 314 is threadedly secured to the radially inner ends of the plate members 306 to axially position a lever element 178 against a thrust washer 316 abutting a thrust bearing 318. The thrust bearing 318 absorbs axially thrust applied to an internally threaded worm wheel 320 threadedly engaged with an actuating screw element 322. The actuating screw elements on either side of the rotor shaft assembly 66 are interconnected by universal joints 324 and a universal shaft 326 for simultaneous rotation. An assembly nut 328 holds the worm wheel 320 assembled on the screw shaft adjacent the universal joint 324. A worm gear 330 meshes with each of the worm wheels as more clearly seen in FIG. 17 in order to establish a high reduction gear ratio between a small reversible motor 332 and the actuating screw element 322. Accordingly, a pair of motors 332 are fixedly mounted on the rotor hub on either side of the rotor shaft assembly 66. The screw elements 322 extend into the rotor blade assemblies 20 and are threadedly engaged with a nut element 334 secured to the radially inner end of the inner tube 304. Accordingly, rotation imparted to the screw element will effect radial displacement of the tube 304 together with the outer air foil member 300 relative to the inner air foil member 302 and the rotor hub 148 to which it is connected. By energization of the motors, in a selected direction, the rotary blade assemblies 20 may thereby be radially extended or radially contracted. The blade assemblies are fully retracted to reduce mechanical loading of the engines 26 to a minimum as fixed wing flight conditions are being approached. Only then will the engines by unloaded by disengagement of the clutches 220.

In the radially contracted position of the rotary blade assemblies 20, as shown in FIGS. 13 and 14, the outer air foil members 300 engage limit switches 336 through which the motors 332 are deenergized. Another limit switch internally mounted within the rotary blade assembly similarly controls deenergization of the motors when an extended condition of the rotary blade assembly is reached. Further, a sliding contact element 338 fixed to the inner tubular member 304 is slidable therewith on a pair of resistor rod elements 340, as more clearly seen in FIG. 15. The resistor rod elements 340 are thereby arranged to electrically provide an indication of the extended position of the rotary blade assembly.

FIG. 19 shows by way of example a simplified electrical circuit for control of the reversible motors 332 and for indicating the radial positions of the rotary blade assemblies 20. The motors 332 are connected in parallel to a source of voltage 342 through a motor control device 344, the motor energizing circuit for each motor being completed through the normally closed limit switch 336 in series with the normally closed limit switch 346 opened when the rotary blade assembly reaches its radially outer position. Also, an appropriately calibrated volt meter 348 is connected to the sliding contact 338 in order to indicate the position of the rotary blade assemblies between their limit positions. Reversal of the motors 332 is automatically effected under control of the signal voltage input to the voltmeter 348 reflecting the radial extension of the rotor blades and the air speed signal voltage obtained from an air speed sensor 350. The signal voltages are compared by a voltage comparator 352 to provide a motor controlling signal to the motor control 344.

As hereinbefore indicated, extension and retraction of the rotor assembly by the mechanism 78 is effected through the actuating cable 82, the opposite ends of which are connected to an actuating lever 85 as shown in FIG. 7. The actuating lever 85 is supported within the yoke 110 to which the casing 86 of the mechanism 78 is connected, the yoke being pivotally mounted by the pivot 83 at one end of the support tube 84, the other end of which is pivotally connected to the fuselage frame by the standard 94, as seen in FIG. 6. The actuating lever 85 is connected by a universal joint 108 to one end of an actuating rod 109, the other end of which is connected to an operating arm 88 pivotally mounted on the support tube 84 by the pivot assembly 90. The pivot support 90 on the support tube 84 is shown located to one side and rearwardly of the pilot's seat 92. The arm 88 is connected to one end of an operating rod 94 on which an angularly displaceable operating sleeve 96 is mounted. Angular movement of the sleeve 96 is transmitted by the connecting rod 98 and bell crank 100 to an actuating rod 102 to which the throttle levers 104 are connected. Thus, the pilot may operate the pitch control mechanism 78 by pivotal displacement of the rod 94 about the pivot 90 and may at the same time coordinate the supply of fuel to the engines by twist of the sleeve 96 to operate the throttle levers 104. The throttle levers 104, on the other hand, may be directly actuated by the pilot independently of the mechanism 78 when the rotor assembly is in its retracted position.

Referring now to FIG. 8, when the rotor assembly is in its extended position and rotating above a predetermined speed, the centrifugal weights 400 in the device 73 connected to shaft 186 will cause the lever elements 402 to pivot radially outwardly and thereby displace the plates 404 downwardly against the bias of spring 406 out of engagement with the lower end of the housing 408 to which limit switch 410 is secured. The housing 408 is, of course, non-rotatable with the screw element 180 to which it is connected by the fasteners 412. Also, the housing 408 encloses a slip ring assembly 414 through which electrical connections are established between the motors 332, the sliding contact 338, the resistor rod elements 340 aforementioned, and the source of voltage and the position indicating volt meter 348. The switch device 410 is of the normally closed type and is operative to prevent retraction of the rotor assembly while it is rotating. However, in the non-rotatable condition of the rotor assembly, the switch device 410 will be engaged by the plate 404 as shown in FIG. 8 in order to cause it to open and thereby permit retraction of the rotor assembly. FIG. 19 illustrates by way of example a retraction preventing solenoid 414 connected to the source through the normally closed switch device 410. The solenoid control device 414 may be arranged, for example, to engage and hold the operating rod 94 in its upper position corresponding to the extended position of the rotor assembly.

It should be appreciated that the pilot's seat 92 as shown in FIGS. 6 and 7 will be properly located relative to a control panel frame 354 supported by the standard 94 on which the various pilot controls and instruments are mounted including the throttle levers 104, the fuel and propellant control valve actuators, transmission clutch and brake controls, choke controls and indicators or meters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A composite aircraft including a fuselage, a rotatable wing assembly, means mounting the rotatable wing assembly for rotation on the fuselage, thrust producing means mounted on the fuselage for propulsion thereof, disengageable drive means drivingly connecting said thrust producing means to the rotatable wing assembly for powered rotation thereof, means for retracting the rotatable wing assembly into the fuselage and means connected to the rotatable wing assembly for preventing retraction thereof in response to powered rotation.

2. A composite aircraft including a fuselage having a longitudinal axis, a rotatable wing assembly mounted on the fuselage for powered rotation, fixed wings secured to and diverging downwardly from the fuselage toward outer tip portions extending at an angle to the longitudinal axis of the fuselage between 45° and 60°, and aileron means connected to said tip portions and extending at an upward incline from the fixed wings for receiving the downwash from the rotatable wing assembly.

3. A composite aircraft comprising a fuselage, fixed wings secured to the fuselage, a rotatable wing assembly, means mounting the rotatable wing assembly for rotation about a single axis fixed to the fuselage, thrust producing means mounted on the fuselage for propulsion thereof, disengageable drive means drivingly connecting said thrust producing means to the rotatable wing assembly for powered rotation thereof, said rotatable wing assembly including radially extensible blade means for varying the loading imposed on the thrust producing means when drivingly connected to the rotatable wing assembly, control means connected to the blade means for reducing the loading on the thrust producing means toward a minimum, and disengaging means connected to the drive means for unloading the rotatable wing assembly from the thrust producing means when the loading has been reduced to said minimum, a retraction mechanism for retracting the rotatable wing assembly into the fuselage and means connected to the rotatable wing assembly for preventing retraction thereof in response to powered rotation.

4. A composite aircraft comprising a fuselage, fixed wings secured to the fuselage, a rotatable wing assembly, means mounting the rotatable wing assembly for rotation about a single axis fixed to the fuselage, thrust producing means mounted on the fuselage for propulsion thereof, disengageable drive means drivingly connecting said thrust producing means to the rotatable wing assembly for powered rotation thereof, said rotatable wing assembly including radially extensible blade means for varying the loading imposed on the thrust producing means when drivingly connected to the rotatable wing assembly, control means connected to the blade means for reducing the loading on the thrust producing means toward a minimum, and disengaging means connected to the drive means for unloading the rotatable wing assembly from the thrust producing means when the loading has been reduced to said minimum, said fixed wings diverging downwardly from the fuselage toward outer tip portions extending at an angle to the longitudinal axis of the fuselage between 45° and 60°, and aileron means connected to said tip portions and extending at an upward incline from the fixed wings for receiving the downwash from the rotatable wing assembly.

5. The combination of claim 4 wherein said thrust producing means includes a combustion turbine connected to the drive means, exhaust nozzle means connected to the turbine for discharge of combustion products therefrom, compressor means driven by the turbine for inducing inflow of air to the turbine, after-burner means for conducting the combustion products from the turbine to exhaust nozzle means, and conduit means for conducting flow between the compressor means and the after-burner means in by-pass relation to the turbine.

6. The combination of claim 5 wherein the thrust producing means further includes adjustable choke means for varying the inflow rate of air to the compressor means during powered rotation of the rotatable wing assembly and means for supplying propellant fuel to the after-burner means while the turbine is unloaded from the rotatable wing assembly.

7. The combination of claim 6 wherein said propellant supplying means includes means for selectively feeding rocket fuel and oxygen directly to the after-burner means during accelerating rocket operation of the thrust producing means and means for selectively feeding a refrigerant fluid to the conduit means during ram jet operation of the thrust producing means.

8. The combination of claim 7 including heat exchange means conducting the refrigerant fluid to the thrust producing means in heat transfer relation to the fixed wings for cooling the fluid.

9. The combination of claim 8 including indicator means connected to the radially adjustable blade means for indicating radial extension thereof.

10. The combination of claim 9 including a retraction mechanism for retracting the rotatable wing assembly into the fuselage and means connected to the rotatable wing assembly for preventing retraction thereof in response to powered rotation.

11. A composite aircraft comprising a fuselage, a rotatable wing assembly, means mounting the rotatable wing assembly for rotation on the fuselage, thrust producing means mounted on the fuselage for propulsion thereof, disengageable drive means drivingly connecting said thrust producing means to the rotatable wing assembly for powered rotation thereof, and disengaging control means connected to the drive means for unloading the rotatable wing assembly from the thrust producing means, said thrust producing means including a combustion turbine connected to the drive means, reaction nozzle means connected to the turbine for discharge of combustion products therefrom, and compressor means driven by the turbine for inducing inflow of air to the turbine, the thrust producing means further including adjustable choke means for varying the inflow rate of air to the compressor means during powered rotation of the rotatable wing assembly, after-burner means for conducting the combustion products from the turbine to the nozzle means, conduit means for conducting flow between the compressor means and the after-burner means in by-pass relation to the turbine and means for supplying propellant fuel to the after-burner means while the turbine is unloaded from the rotatable wing assembly, said propellant supplying means including means for selectively feeding rocket fuel and oxygen directly to the after-burner means during accelerating rocket operation of the thrust producing means and means for selectively feeding a refrigerant fluid to the conduit means during ram jet operation of the thrust producing means.

12. The combination of claim 11 including fixed wings secured to the fuselage, and heat exchange means conducting the refrigerant fluid to the thrust producing means in heat transfer relation to the fixed wings for cooling the same.

13. A convertible thrust and lift producing power plant for an aircraft comprising a combustion turbine having a combustion chamber and turbine blades, mechanical load means disengageably connected to the turbine blades, reaction nozzle means connected to the turbine for discharge of combustion products generated in the combustion chamber, compressor means driven by the turbine blades for inducing inflow of air to the turbine, after-burner means for conducting the combustion products from the turbine combustion chamber to the nozzle means, conduit means for conducting flow between the compressor means and the after-burner means in by-pass relation to the turbine, and means for supplying propellant fuel to the after-burner means while the turbine is unloaded from the load means, said propellant supplying means including means for selectively feeding rocket fuel and oxygen directly to the after-burner means during accelerating rocket operation and means for selectively feeding a refrigerant fluid to the conduit means during ram jet operation of the aircraft.

* * * * *